United States Patent
Endo et al.

(10) Patent No.: US 9,219,273 B2
(45) Date of Patent: Dec. 22, 2015

(54) ACTIVE MATERIAL FOR LITHIUM SECONDARY BATTERY, ELECTRODE FOR LITHIUM SECONDARY BATTERY, AND LITHIUM SECONDARY BATTERY

(75) Inventors: Daisuke Endo, Kyoto (JP); Yoshihiro Katayama, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 42 days.

(21) Appl. No.: 13/816,610

(22) PCT Filed: Sep. 21, 2011

(86) PCT No.: PCT/JP2011/071440
§ 371 (c)(1),
(2), (4) Date: Feb. 12, 2013

(87) PCT Pub. No.: WO2012/039413
PCT Pub. Date: Mar. 29, 2012

(65) Prior Publication Data
US 2013/0146808 A1    Jun. 13, 2013

(30) Foreign Application Priority Data

Sep. 22, 2010  (JP) ................................. 2010-212383
Sep. 28, 2010  (JP) ................................. 2010-217905

(51) Int. Cl.
| | | |
|---|---|---|
| *H01M 4/131* | (2010.01) | |
| *H01M 4/505* | (2010.01) | |
| *H01M 4/525* | (2010.01) | |
| *H01M 10/0525* | (2010.01) | |

(52) U.S. Cl.
CPC .............. *H01M 4/131* (2013.01); *H01M 4/505* (2013.01); *H01M 4/525* (2013.01); *H01M 10/0525* (2013.01); *Y02E 60/122* (2013.01); *Y02T 10/7011* (2013.01)

(58) Field of Classification Search
CPC ..................................................... H01M 4/131
USPC ..................................................... 252/182.1
See application file for complete search history.

(56) References Cited

U.S. PATENT DOCUMENTS

| 6,277,305 B1 * | 8/2001 | Gorge et al. ................ 252/518.1 |
| 2010/0173202 A1 * | 7/2010 | Saito et al. ..................... 429/224 |
| 2010/0248032 A1 * | 9/2010 | Pitteloud et al. .............. 429/221 |
| 2010/0276217 A1 * | 11/2010 | Sugaya et al. ................ 180/65.1 |
| 2011/0037440 A1 * | 2/2011 | Endo et al. ..................... 320/162 |
| 2013/0146808 A1 * | 6/2013 | Endo et al. ................. 252/182.1 |

FOREIGN PATENT DOCUMENTS

| JP | 2009-032681 | 2/2009 |
| JP | 4320548 | 6/2009 |
| JP | 2010-192424 | 9/2010 |
| JP | 2010192424 A | * 9/2010 |
| WO | 2009/139157 | 11/2009 |
| WO | WO 2009139157 A1 * | 11/2009 |

OTHER PUBLICATIONS

Park et al. Materials Chemistry and Physics, vol. 95, Issues 2-3, Feb. 10, 2006, pp. 218-221.*
International Search Report filed in PCT/JP2011/071440.
International Search Report filed in PCT/JP2011/071440, Dec. 27, 2011.

* cited by examiner

*Primary Examiner* — Nicole M Buie-Hatcher
*Assistant Examiner* — M. Reza Asdjodi
(74) *Attorney, Agent, or Firm* — Rankin, Hill & Clark LLP

(57) ABSTRACT

[Object]; There is provided an active material for a lithium secondary battery, which has a high initial efficiency and a high discharge capacity, and particularly has a high discharge capacity at a low temperature (excellent low-temperature characteristic), and a lithium secondary battery using the active material. [Solution]; An active material for a lithium secondary battery, which contains a solid solution of a lithium transition metal composite oxide having an α-NaFeO$_2$ crystal structure, wherein the composition ratio of metal elements contained in the solid solution satisfies, Li$_{1+x-y}$Na$_y$Co$_a$Ni$_b$Mn$_c$O$_{2+d}$ (0<y≤0.1, 0.4≤c≤0.7, x+a+b+c=1, 0.1≤x≤0.25, −0.2≤d≤0.2), the active material has an X-ray diffraction pattern attributable to a space group R3-m (P3$_1$12), and in the Miller index hkl, the half width of the diffraction peak of the (003) is 0.30° or less and the half width of the diffraction peak of the (114) plane is 0.50° or less. Further, the average of three oxygen position parameters determined from crystal structure analysis by the Rietveld method on the basis of the X-ray diffraction pattern is preferably 0.264 or less.

6 Claims, No Drawings

ACTIVE MATERIAL FOR LITHIUM SECONDARY BATTERY, ELECTRODE FOR LITHIUM SECONDARY BATTERY, AND LITHIUM SECONDARY BATTERY

TECHNICAL FIELD

The present invention relates to an active material for a lithium secondary battery, and a lithium secondary battery using the same.

BACKGROUND ART

Principally $LiCoO_2$ has been used as a positive active material for lithium secondary batteries. However, the discharge capacity is about 140 to 150 mAh/g.

Materials are known in which $LiCoO_2$ forms a solid solution with other compounds. $Li[Co_{1-2x}Ni_xMn_x]O_2$ ($0<x\leq\frac{1}{2}$), a solid solution having an $\alpha$-$NaFeO_2$ crystal structure and formed of three components: $LiCoO_2$, $LiNiO_2$ and $LiMnO_2$, was published in 2001. Lithium secondary batteries using, as an active material, $LiNi_{1/2}Mn_{1/2}O_2$ or $LiCo_{1/3}Ni_{1/3}Mn_{1/3}O_2$ that is one example of the aforementioned solid solution have a discharge capacity of 150 to 180 mAh/g, which is superior to that of lithium secondary batteries using $LiCoO_2$.

Non-Patent Documents 1 to 4 each propose a solid solution having an $\alpha$-$NaFeO_2$ crystal structure and formed of three components: $Li[Li_{1/3}Mn_{2/3}]O_2$, $LiNi_{1/2}Mn_{1/2}O_2$ and $LiCoO_2$. This material, as can be expressed as Li[Li, Mn, Ni, Co]$O_2$, has Li, in addition to a transition metal, at a site where Co is present in $LiCoO_2$ having an $\alpha$-$NaFeO_2$ crystal structure. Therefore, a higher discharge capacity can be expected, and Non-Patent Documents 1 to 4 each describe a discharge capacity of about 180 to 200 mAh/g.

However, as in Comparative Example described later, lithium secondary batteries having the above-mentioned solid solution as an active material have such a problem that although the discharge capacity (25° C.) is high, the irreversible capacity during initial charge-discharge is high, the initial charge-discharge efficiency (hereinafter, abbreviated as "initial efficiency") is low, and the discharge capacity at a low temperature is low.

A large number of attempts to substitute with a different kind of element a part of the transition metal site of a transition metal compound used in a positive active material for a lithium secondary battery have been made, and it is needless to show examples in other active materials having a tetragonal spinel structure, such as $LiMn_2O_4$. However, the effect brought by substitution with a different kind of element varies among active materials, and needless to say, it is very difficult in the art to predict whether an effect exhibited in a different material is similarly exhibited in another material.

Non-Patent Document 5 describes that the initial efficiency during initial charge as a positive electrode, which originates from $Li[Li_{0.2}Mn_{0.54}Ni_{0.13}Co_{0.13}]O_2$, can be improved by mixing $V_2O_3$ with $Li[Li_{0.2}Mn_{0.54}Ni_{0.13}Co_{0.13}]O_2$ (FIG. 2, FIG. 3).

Non-Patent Document 6 describes that the initial efficiency during initial charge-discharge is improved as a result of treating an active material: $0.3Li_2MnO_3\cdot0.7LiNi_{0.5}Mn_{0.5}O_2$ with nitric acid (FIG. 4, FIG. 5).

Non-Patent Document 7 describes that the initial efficiency during initial charge-discharge is improved as a result of treating an active material: $0.3Li_2MnO_3\cdot0.7LiNi_{0.5}Mn_{0.5}O_2$ with nitric acid, followed by further exposing the active material in an ammonia gas stream at 200° C. for 20 hours (Table 2, FIG. 5, FIG. 6).

Non-Patent Document 8 describes that by substituting with fluorine a part of oxygen forming an active material so that the active material is represented by Li $(Li_{0.2}Ni_{0.15+0.5z}Co_{0.10}Mn_{0.55-0.5z})O_{2-z}F_z$ ($0\leq z\leq0.10$), the impedance of a battery having the active material as a positive electrode and graphite as a negative electrode can be reduced (FIG. 5).

Patent Document 1 describes "a lithium/nickel/manganese/cobalt composite oxide of layered structure, which has a chemical composition of $Li_aNi_xMn_yCo_zO_{2+b}$ (x+y+z=1, 1.00<a<1.3, 0≤b<0.3), wherein the diffraction peak angles 2θ of the (003) plane and the (104) plane in the Miller index hkl in powder X-ray diffraction using a CuKα ray are 18.65° or more and 44.50° or more, respectively, the diffraction peak half widths thereof are both 0.18° or less, the diffraction peak angles 2θ of the (108) plane and the (110) plane are 64.40° or more and 65.15° or more, respectively, and the diffraction peak half widths thereof are both 0.18° or less" (claim 1), and describes that "if the diffraction peak angles 2θ of the (003) plane and the (104) plane in the Miller index hkl of powder X-ray diffraction using a CuKα ray are less than 18.65° and less than 44.50°, respectively, the phase interval decreases, so that diffusion of lithium ions are hindered, leading to deterioration of a charge-discharge characteristic; and if the diffraction peak half widths of these planes are both larger than 0.18°, the charge-discharge characteristic is deteriorated because of insufficient growth of crystals or large variations in composition" (paragraph [0017]).

Patent Document 2 describes the invention of "a positive active material having as a main component a composite oxide represented by $Li[Mn_cNi_dCo_eLi_aM''_b]O_2$ (where M'' is at least one element selected from the group consisting of B, Mg, Al, Ti, V, Cr, Fe, Cu and Zn, d≤c+e+a+b, c+d+e+a+b=1, 0≤a≤0.05, 0≤b≤0.05, 0.2≤c≤0.5, 0.02≤e≤0.4), wherein the specific surface area is 0.3 m²/g to 1.5 m²/g (inclusive) as measured by the BET method, the positive active material has an X-ray diffraction pattern attributable to a space group R3/m, the relative intensity ratio of a diffraction peak at 2θ=44.1±1° to a diffraction peak at 2θ=18.6±1° is 0.6 to 1.1 (inclusive), the half width of a diffraction peak at 2θ=18.6±1° is 0.13° to 0.20° (inclusive), the half width of a diffraction peak at 2θ=44.1±1° is 0.10° to 0.17° (inclusive), and the particle diameter is 3 μm to 20 μm (inclusive)"(claim 6), and also shows that a lithium secondary battery using the active material can have both an excellent high rate discharge characteristic and excellent charge-discharge cycle performance.

Patent Document 3 describes "a positive active material containing a composite oxide represented by $Li_aMn_{0.5-x}Ni_{0.5-y}M_{x+y}O_2$ (where 0<a<1.3, -0.1≤x-y≤0.1, M is an element other than Li, Mn and Ni)" (claim 1), and also describes that "the positive active material according to claim 2 is characterized in that the M is at least one element selected from the group consisting of Al, Mg and Co, and the positive active material contains a composite oxide in which the coefficients in the composition formula satisfy the following formula: 0.05≤x<0.3, 0.05≤y<0.3, -0.1≤x-y≤0.02, 0<a<1.3 and x+y<0.5; and according to this configuration, a positive active material, which allows production of a nonaqueous electrolyte secondary battery particularly being excellent in high rate discharge performance and charge-discharge cycle performance and having a high energy density, can be obtained" (page 6, line 7 from the bottom to page 7, line 4). However, it is described that "the positive active material according to claim 7 is characterized in that the half width of the diffraction peak at 2θ: 18.6±1° is 0.05° to 0.20° (inclusive), and the half width of the diffraction peak at 2θ: 44.1±1° is 0.10° to 0.20° (inclusive); and according to this configuration, a positive active material, which allows production of a nonaqueous electrolyte secondary battery particularly having a high energy density (high discharge capacity) and being excellent in charge-discharge cycle performance, can be obtained" (page 9, line 11 to line 16).

Patent Document 4 describes the invention of "an active material for a lithium secondary battery comprising a solid solution of a lithium transition metal composite oxide having an α-NaFeO$_2$ crystal structure, wherein the composition ratio of Li, Co, Ni and Mn contained in the solid solution satisfies Li$_{1+1/3x}$Co$_{1-x-y}$Ni$_{y/2}$Mn$_{2x/3+y/2}$ (x+y≤1, 0≤y, 1−x−y=z), (x, y, z) is represented by a value present on the line of or within a heptagon ABCDEFG having point A (0.45, 0.55, 0), point B (0.63, 0.37, 0), point C (0.7, 0.25, 0.05), point D (0.67, 0.18, 0.15), point E (0.75, 0, 0.25), point F (0.55, 0, 0.45) and point G (0.45, 0.2, 0.35) as apexes, in a Li[Li$_{1/3}$Mn$_{2/3}$]O$_2$(x)-Li Ni$_{1/2}$Mn$_{1/2}$O$_2$(y)-LiCoO$_2$(z)-system triangular phase diagram, and the intensity ratio of the diffraction peak of the (003) plane and the (104) plane in X-ray diffraction measurement is I$_{(003)}$/I$_{(104)}$≤1.56 before charge-discharge, and I$_{(003)}$/I$_{(104)}$>1 at the end of discharge" (claim 1).

Patent Document 5 describes the invention of "a positive active material comprising lithium-containing metal composite oxide particles, wherein the half width of an X-ray diffraction peak, which can be attributed to a space group R-3m and corresponds to the (104) plane, is within a range of 0.06 to 0.15°, and the average of shape coefficients SF1 calculated by the following formula (1) is more than 1 and equal to or less than 3.3 . . . " (claim 1), and also shows that the crystal structure of lithium-containing metal composite oxide particles is attributed to a space group R-3m, and a high discharge load characteristic (high rate discharge characteristic) is obtained when the half width of an X-ray diffraction peak corresponding to the (104) plane is within a range of 0.06 to 0.15°, and if the half width is more than 0.15°, the crystallinity of the lithium-containing metal composite oxide is reduced, so that it is difficult to obtain a high rate discharge characteristic (paragraph [0025]).

Patent Document 6 describes that "an additional function can be exhibited by doping LiNi$_{1/3}$Mn$_{1/3}$Co$_{1/3}$O$_2$ of the invention with a different kind of element . . . " (paragraph [0077]), and also shows that an oxide represented by Li[Li$_x$(Ni$_{1/3}$Mn$_{1/3}$Co$_{1/3}$)$_{1-x}$]O$_2$ (where 0≤x≤0.3), which has an increased lithium atom ratio, can be used, and a nickel manganese cobalt composite oxide prepared by mixing a composite oxide obtained in coprecipitation and lithium hydroxide in a dry process, and calcinating the mixture at 1000° C. is a hexagonal crystal system that belongs to a layer structure R-3m (paragraphs [0028] to [0030]).

Patent Document 7 describes the invention of "a lithium nickel manganese cobalt-based composite oxide powder for a lithium secondary battery positive electrode material, which comprises a crystal structure attributed to a layered structure and the composition of which is represented by the following formula (I):

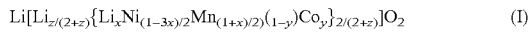

(where 0.01≤x≤0.15, 0≤y≤0.35, 0.02(1−y)(1−3x)≤z≤0.15 (1−y)(1−3x))" (claim 6), and shows that it is important that the composite oxide is slightly rich in Li amount as compared to the stoichiometric composition, whereby battery performance (particularly rate characteristic and power characteristic) is improved (paragraphs [0014] and [0015]).

Patent Document 8 describes the invention of "a nonaqueous electrolyte secondary battery comprising a positive electrode containing a positive active material formed of a lithium-containing oxide, a negative electrode, and a non-aqueous electrolyte, wherein the lithium-containing oxide contains Li$_A$Na$_B$Mn$_x$Co$_y$O$_{2±α}$ (where 0.5≤A≤1.2, 0<B≤0.01, 0.40≤x≤0.55, 0.40≤y≤0.55, 0.80≤x+y≤1.10 and 0≤α≤0.3) that belongs to a space group P6$_3$mc and/or a space group Cmca" (claim 1), and shows that by having this composition to thereby increase the charge potential, the crystal structure becomes hard to be collapsed even though a large amount of Li is drawn off (paragraph 0069), so that a high initial charge-discharge efficiency, a high charge-discharge capacity and good cycle performance are obtained. (Paragraph 0133)

Patent Document 9 describes the invention of "a positive active material for a lithium secondary battery, which comprises a layered rock-salt-type lithium composite oxide that belongs to a space group of R-3m, wherein the lithium composite oxide has a composition represented by the following general formula (1):

(where x and y each represent an atom ratio, 0.05≤x≤0.35, 0.01≤y≤0.20, and M represents at least one element selected from the group consisting of Mn, Fe, Al, Ga and Mg; and α and β represent an atom ratio provided that the sum of Ni, Co and element M is 1, 0<α<1.1 and 1.9<β<2.1), the oxygen position parameter (Zo) is 0.2360 to 0.2420, and the lithium-oxygen distance (d) defined by the following formula (2) is 0.2100 nm to 0.2150 nm" (claim 1), and shows that a good initial discharge capacity and charge-discharge cycle characteristics are obtained by preparing such a positive active material that the oxygen position parameter (Zo) and the lithium-oxygen distance (d) have, in a specific composition range, a good correlation with the initial discharge capacity and charge-discharge cycle characteristics, and the oxygen position parameter (Zo) and the lithium-oxygen distance (d) fall within a certain range. (paragraph 0016)

PRIOR ART DOCUMENTS

Non-Patent Documents

Non-Patent Document 1: Electrochim. Acta, vol. 51, page 5581-5586, 2006.
Non-Patent Document 2: J. Power Sources, vol. 146, page 598.601, 2005.
Non-Patent Document 3: J. Electrochem. Soc., vol. 152, No. 1, page A171-A178, 2005.
Non-Patent Document 4: Mater. Lett., vol. 58, page 3197-3200, 2004
Non-Patent Document 5: Electrochemistry Communications, vol. 11, p. 84-86, 2009
Non-Patent Document 6: Electrochemistry Communications, vol. 6, p. 1085-1091, 2004.
Non-Patent Document 7: J. Power Sources, Chem., vol. 153, p. 258-264, 2006.
Non-Patent Document 8: J. Power Source, vol. 146, page 654-657, 2005.

Patent Documents

Patent Document 1: JP-4216669
Patent Document 2: JP-4320548
Patent Document 3: WO 2002/086993
Patent Document 4: WO 2009/063838
Patent Document 5: JP-A-2003.178756
Patent Document 6: JP-A-2003-17052
Patent Document 7: JP-A-2006-253119
Patent Document 8: JP-A-2009-32681
Patent Document 9: JP-A-2002-124261

DISCLOSURE OF THE INVENTION

Problems to be Solved by the Invention

In Non-Patent Document 5, V$_2$O$_5$ containing no lithium in a molecule is mixed, and therefore in a battery formed by combining general carbon negative electrodes, a sufficient amount of lithium cannot be inserted into $V_2O_5$ with lithium alone in an electrolyte solution so that the effect of improving the initial efficiency of the battery is not sufficient. Further, reduction of the charge discharge capacity of $V_2O_5$ associated with a charge-discharge cycle is significant. In addition, substantial improvement of the initial efficiency of an active material is not achieved. Further, as to Non-Patent Documents 6 and 7, there is the problem that the battery capacity and cycle performance are depressed due to elution of Mn associated with reduction of the oxidation number of Mn by an acid treatment.

Non-Patent Document 8 neither shows data at a low temperature nor describes that the Li site is substituted with Na.

In Patent Documents 1 to 7, it is not described at all that a part of Li of a lithium transition metal oxide is substituted with Na, and it does not shown that the initial efficiency is improved by ensuring that the half width of an active material with a specific composition of a composite oxide substituted with Na falls within a specific range. Further, a relationship between the oxygen position parameter of a lithium transition metal oxide and the low-temperature characteristic is not mentioned, and therefore an effect of improving the low-temperature characteristic is not obtained by the above-mentioned technique.

In Patent Document 8, a lithium-containing layered oxide $Li_ANa_BMn_xCo_yO_{2\pm\alpha}$ is synthesized by chemical ion exchange after a sodium-containing layered compound is prepared. It is shown that in this method, $Li_2MnO_3$ is contained as a solid solution or a mixture, or both thereof (paragraph 0107). It is considered that since the $Li_2MnO_3$ inserts Li during initial discharge, a phenomenon occurs in which the initial efficiency exceeds 100% (paragraph 0129, Example 2). Generally, it is known that when charge-discharge of $Li_2MnO_3$ is carried out, crystals are collapsed, and therefore the capacity may be reduced in accordance with the ratio of $Li_2MnO_3$ contained at least in an active material, with the cycle, thus being not preferable. Even the used of a positive electrode, the initial efficiency of which exceeds 100%, does not lead to substantial improvement of the energy density of the battery because sufficient lithium for filling the discharge capacity of the positive electrode does not exist in a battery system when a general lithium insertion/extraction material such as graphite is used for a negative electrode. Further, it is not suggested that the initial efficiency is significantly improved by ensuring that the half width of the diffraction peak of a lithium-containing metal composite oxide substituted with Na falls within a specific range, and that the low-temperature characteristic is significantly improved by controlling the oxygen position parameter of the lithium-containing metal composite oxide substituted with Na.

Patent Document 9 describes that a layered rock salt-type lithium-containing metal composite oxide and the oxygen position parameter and lithium-oxygen distance is related to the initial discharge capacity and charge-discharge cycle characteristics, but does not suggest that the lithium-containing metal composite oxide is substituted with Na and that the low-temperature characteristic is significantly improved by controlling the oxygen position parameter of the lithium-containing metal composite oxide substituted with Na.

The present invention has been devised in view of the above-mentioned problems, and has as an object the provision of an active material for a lithium secondary battery, which has a high initial efficiency and a high discharge capacity, and particularly has a high discharge capacity at a low temperature (excellent low-temperature characteristic), and a lithium secondary battery using the active material.

Means for Solving the Problems

The constitution and effects of the present invention will be described along with technical ideas. However, the effects include estimations, and whether they are correct or incorrect does not limit the present invention. The present invention can be carried out in various other forms without departing from its spirit or main features. Therefore, embodiments or Examples described later are illustrative only in every respect, and should not be taken in a limited sense. Modifications and changes belonging to equivalents of claims are all within the scope of the present invention.

An active material for a lithium secondary battery according to the present invention is characterized by containing Na, but in the case of the present invention, Na substitutes a Li site. Na substitution here is performed on the basis of such an idea that $NaCoO_2$ is solid-dissolved in $Li[Li, Mn, Ni, Co]O_2$. Namely, the Na substitution is expressed as the chemical composition formula $Li_{1-y}Na_y(Li_xCo_aNi_bMn_c)O_{2+d}$, and by modification thereof, the chemical composition formula $Li_{1+x-y}Na_yCo_aNi_bMn_cO_{2+d}$ of the active material for a lithium secondary battery of the present invention is obtained. However, also in this case, the valences of metal elements existing at the transition metal site should be noted. For the active material for a lithium secondary battery of the present invention, in its composition formula, the valences of the elements seem to not be $Li^{1+}$, $Mn^{4+}$, $Ni^{2+}$ and $Co^{3+}$. Actually, however, it has been confirmed from X-ray absorption fine structure (XAFS) analysis that the valences of the elements are $Li^{1+}$, $Mn^{4+}$, $Ni^{2+}$ and $Co^{3+}$.

The present invention is an active material for a lithium secondary battery, which contains a solid solution of a lithium transition metal composite oxide having an $\alpha$-$NaFeO_2$ crystal structure, wherein the composition ratio of metal elements contained in the solid solution satisfies $Li_{1+x-y}Na_yCo_aNi_b$-$Mn_cO_{2+d}$ ($0<y\le0.1$, $0.4\le c\le0.7$, $x+a+b+c=1$, $0.1\le x\le0.25$, $-0.2\le d\le0.2$).

Generally, it is known as a fact that an element composition ratio determined by chemically analyzing a compound obtained actually by synthesizing through a calcination step a lithium transition metal composite oxide having an $\alpha$-$NaFeO_2$ crystal structure varies slightly (by about 5%) compared to a composition calculated from the charge composition ratio of a raw material. The present invention can be carried out without departing from its technical ideas or main features, and it is needless to say that a compound obtained by synthesis should not be taken as not belonging to the scope of the present invention only because the composition thereof is not exactly consistent with the above-mentioned composition formula. Particularly, for the amount of Li, it is known that Li is easily volatilized in the calcination step. Also, the coefficient of the oxygen atom can vary depending on synthesis conditions and so on and, is not limited to exactly 2, and a compound should not be taken as not belonging to the scope of the present invention merely because it is deficient in oxygen.

The active material of the present invention may contain elements other than Li, Co, Ni, Mn, Na and O, and even when elements other than Li, Co, Ni, Mn, Na and O are contained, it is required for the active material of the present invention that among elements forming the solid solution, the valences of Li, Co, Ni and Mn be valences of $Li^{1+}$, $Co^{3+}$, $Ni^{2+}$ and $Mn^{4+}$, respectively. The amount of Li in the active material changes and the valences of the transition metals change with charge-discharge of the battery, but even for an active material taken from a battery, the charge-discharge of which is unknown, the ratio of metal elements including Li at the time of synthesis of the active material can be known by combination of ICP emission spectroscopic analysis, X-ray diffractometry, oxygen amount analysis and so on, so that whether the active material belongs to the technical scope of the present invention or not can be determined.

Here, a powder obtained merely by powder raw materials containing Li, Na, Co, Ni, Mn and so on cannot be used as the "solid solution" according to the present invention. Individuals of these materials have different peak positions corresponding to lattice constants, which are observed when X-ray diffraction measurements are made, and therefore if X-ray diffraction measurements are made for these mere mixtures, diffraction patterns corresponding to respective individuals are obtained.

As described above, a high charge-discharge capacity can be achieved by "an active material for a lithium secondary battery, which contains a solid solution of a lithium transition metal composite oxide having an α-NaFeO$_2$ crystal structure, wherein the composition ratio of metal elements contained in the solid solution satisfies $Li_{1+x-y}Na_yCo_aNi_bMn_cO_{2+d}$ (0<y≤0.1, 0.4≤c≤0.7, x+a+b+c=1, 0.1≤x≤0.25, −0.2≤d≤0.2)", but further in the present invention, a solid solution, which has an X-ray diffraction pattern attributable to a space group P3$_1$12 and in which in the Miller index hkl, the half width of the diffraction peak of the (003) plane is 0.30° or less and the half width of the diffraction peak of the (114) plane is 0.50° or less, is used as an active material for improving the initial efficiency and improving the discharge capacity at a low temperature (low-temperature characteristic). As shown in Comparative Example 15 described later, even though the composition ratio of the above-mentioned metal elements is satisfied, not only neither an excellent initial efficiency nor an excellent low-temperature characteristic is obtained but also the discharge capacity (25° C.) is reduced when the half width of the diffraction peak of the (003) plane is more than 0.30° or the half width of the diffraction peak of the (114) plane is more than 0.50° in the X-ray diffraction pattern.

In the present invention, it is preferable to use as an active material a solid solution in which the oxygen position parameter determined from crystal structure analysis by the Rietveld method on the basis of an XRD diffraction pattern is 0.264 or less for improving the low-temperature characteristic. As shown in Comparative Examples 16 and 17 described later, even though the composition ratio of the above-mentioned metal elements is satisfied, an excellent low-temperature characteristic cannot be obtained when the oxygen position parameter is more than 0.264.

Here, when crystal structure analysis by the Rietveld method is performed for a material attributed to the space group P3$_1$12, three oxygen position parameters: O1, O2 and O3 are obtained for oxygen. The oxygen position parameter defined in the present invention refers to the average of these three oxygen position parameters. The oxygen position parameter being 0.264 or less means that the average of three oxygen position parameters is less than 0.2645.

The X-ray diffraction pattern of the solid solution according to the present invention is attributable to the space group P3$_1$12, but it is not impossible to attribute the X-ray diffraction pattern to the space group R3-m. At this time, the diffraction peak of the (114) plane when the X-ray diffraction pattern is attributed to the space group P3$_1$12 is required to be interpreted as the "diffraction peak of the (104) plane" when the X-ray diffraction pattern is attributed to the space group R3-m. Here, concerning notation of the space group, strictly speaking, "R3-m" should be wrote with a bar "-" added above "3", but it is wrote as "R3-m" for the sake of convenience in this specification.

Here, selection of a value in a range of 0.1≤x≤0.25 as x is preferable because a relatively high discharge capacity can be exhibited when a synthesized material is used as an active material for a lithium secondary battery. The values of x and y can be appropriately selected in consideration of what battery characteristics are required for a battery in which these values to be employed. The value of y represents an amount of Na, and as shown in Examples described later, even a very small amount of Na provides a significant effect of improving the low-temperature characteristic as compared to a case where Na is not contained. Conversely, since Na does not undergo insertion/extraction unlike Li even when charge-discharge is performed, excessive inclusion of Na is not advantageous, and it is preferable not to include Na too much. When the value of y is changed into various values, how the effect of the present invention is exhibited varies depending on the values of x, a, b and c, and therefore after the values of x, a, b and c employed are determined according to the battery design, the value of y should be changed in accordance with the above-mentioned technical idea, in view of these determined values to employ a suitable value of y. At this time, the value of c is preferably set at 0.4≤c≤0.7 for obtaining a high discharge capacity.

Advantages of the Invention

According to the present invention, an active material for a lithium secondary battery, which has a high initial efficiency and a high discharge capacity, and particularly has a high discharge capacity at a low temperature, can be provided.

MODE FOR CARRYING OUT THE INVENTION

A method for producing an active material for a lithium secondary battery of the present invention will be described.

The active material for a lithium secondary battery of the present invention can be obtained basically by preparing a raw material which contains, in accordance with the composition of an intended active material (oxide), metal elements (Li, Mn, Co, Ni and Na) that forms the active material, and calcinating the raw material. However, it is preferable that the Li raw material be charged in an excessive amount by about 1 to 5% in anticipation of loss of a part of the Li raw material during calcination.

For preparing an oxide having an intended composition, so called a "solid phase method" in which salts of Li, Co, Ni, Mn and Na, respectively, are mixed and calcinated, and a "coprecipitation method" in which a coprecipitation precursor with Co, Ni and Mn existing in one particle is prepared beforehand, a Li salt and a Na salt are mixed and calcinated therewith are known. In a synthesis process by the "solid phase method", it is difficult to obtain a sample with the elements homogeneously distributed in one particle because Mn in particular is hard to be homogeneously solid-dissolved in Co and Ni. In literatures and the like, a large number of attempts to solid-dissolve Mn in a part of Ni and Co by the solid phase method have been hitherto made ($LiNi_{1-x}Mn_xO_2$, etc.), but a homogeneous phase is more easily obtained at an element level by selection of the "coprecipitation method". Thus, in Examples described later, the "coprecipitation method" is employed.

For preparing a coprecipitation precursor, it is very important to establish an inert atmosphere in a solution from which the coprecipitation precursor is to be obtained. Among Co, Ni and Mn, Mn is easily oxidized, so that it is not easy to prepare a coprecipitation hydroxide with Co, Ni and Mn homogeneously distributed in a divalent state, and therefore homogeneous mixing of Co, Ni and Mn at an element level tends to be incomplete. Particularly in the composition range of the present invention, the Mn ratio is high as compared to Co and Ni ratios, and therefore it is still further important to establish an inert atmosphere in the solution. In Examples described later, an inert gas is bubbled into an aqueous solution to remove oxygen, and further a reducing agent is added dropwise in parallel.

The method for preparing the precursor is not limited. A Li compound, a Mn compound, a Ni compound, a Co compound and a Na compound may be merely mixed, or a hydroxide containing transition metal elements may be coprecipitated in a solution, and a Li compound and a Na compound mixed therewith. For preparing a homogeneous composite oxide, a method is preferable in which a coprecipitation compound of Mn, Ni and Co are mixed with a Li compound and a Na compound, and the mixture is calcinated.

For preparation of the coprecipitation hydroxide precursor, a compound is preferable in which Mn, Ni and Co are homogeneously mixed. However, the precursor is not limited to a hydroxide and besides, an insoluble salt in which elements homogeneously exist at an element level, such as a carbonate or a citrate, can be used similarly to a hydroxide. A precursor having a higher bulk density can also be prepared by using a crystallization reaction or the like using a complexing agent. At this time, by mixing and calcinating with a Li source and a Na source, an active material having a high density and a small specific surface area can be obtained, and therefore the energy density per electrode area can be improved.

Examples of the raw material of the coprecipitation hydroxide precursor may include manganese oxide, manganese carbonate, manganese sulfate, manganese nitrate and manganese acetate as a Mn compound, nickel hydroxide, nickel carbonate, nickel sulfate and nickel acetate as a Ni compound, and cobalt sulfate, cobalt nitrate and cobalt acetate as a Co compound.

As a raw material for preparation of the coprecipitation hydroxide precursor, a material in any form can be used as long as it forms a precipitation reaction with an aqueous alkali solution, but it is preferable that a metal salt having a high solubility be used.

In the precipitation reaction for preparing the coprecipitation hydroxide precursor, the oxygen position parameter of the solid solution can be changed by controlling the speed of dropwise addition of a raw material aqueous solution. As in Examples 39 and 40 described later, the oxygen position parameter becomes larger as the speed, at which a raw material aqueous solution is added dropwise, is increased. However, if the speed, at which a raw material aqueous solution is added dropwise, is excessively increased, the oxygen position parameter becomes significantly larger than 0.264 as in Comparative example 16, thus leading to a reduction in low-temperature characteristic. Further, a precursor that is homogeneous at an element level is no longer obtained, the element distribution in the precursor is evidently heterogeneous, and therefore the distribution of elements after calcination is also heterogeneous, so that adequate charge-discharge characteristics cannot be exhibited. Therefore, for obtaining an active material excellent in low-temperature characteristic, it is important to control the speed of dropwise addition of a raw material aqueous solution, and the speed is preferably 10 ml/rain or less.

The active material for a lithium secondary battery in the present invention can be suitably prepared by mixing the coprecipitation hydroxide precursor with a Li compound and a Na compound, followed by heat-treating the mixture. The active material can be suitably produced by using lithium hydroxide, lithium carbonate, lithium nitrate, lithium acetate or the like as a Li compound and sodium carbonate, sodium nitrate, sodium acetate or the like as a Na compound.

For obtaining an active material, which has a high charge-discharge capacity, particularly has a high charge-discharge capacity at a low temperature (improved low-temperature characteristic) and the initial efficiency of which is improved, selection of the calcination temperature is very important.

If the calcination, temperature is too high, the obtained active material is collapsed with an oxygen release reaction, a phase defined as a $Li[Li_{1/3}Mn_{2/3}]O_2$ type of a monoclinic crystal, in addition to a hexagonal crystal as a main phase tends to be observed as a separate phase rather than a solid solution phase, and such a material is not preferable because the reversible capacity of the active material significantly decreases. Therefore, it is important to ensure that the calcination temperature is lower than a temperature at which the oxygen release reaction of the active material is influential. The oxygen release temperature of the active material is generally 1000° C. or higher in the composition range according to the present invention, but since the oxygen release temperature slightly varies depending on the composition of the active material, it is preferable to check the oxygen release temperature of the active material beforehand. Particularly, it should be noted that the oxygen release temperature has been found to shift toward the low temperature side as the amount of Co contained in the active material increases. As a method for checking the oxygen release temperature of the active material, a mixture of a coprecipitation precursor with $LiOH.H_2O$ and $Na_2CO_3$ may be subjected to thermogravimetric analysis (DTA-TG measurement) for simulating a calcination reaction process, but in this method, platinum used in a sample chamber of a measuring instrument may be corroded by a volatilized Li component to damage the instrument, and therefore a composition that is crystallized on some level beforehand by employing a calcination temperature of about 500° C. should be subjected to thermogravimetric analysis.

On the other hand, if the calcination temperature is too low, crystallization does not sufficiently proceed, and active material characteristics are significantly degraded, thus being not preferable. The calcination temperature is required to be at least 700° C. Sufficient crystallization is important for reducing the resistance of a crystal grain boundary to facilitate smooth transportation of lithium ions. Examples of the method for determining the degree of crystallization include visual observation using an scanning electron microscope. The positive active material of the present invention was observed with a scanning electron microscope to find that the positive active material was formed of nano-order primary particles at the active material synthesis temperature of 700° C. or lower, but was crystallized to a sub-micron level by further elevating the active material synthesis temperature, and large primary particles leading to improvement of active material characteristics could be obtained.

On the other hand, one more indicator that shows the degree of crystallization is a half width of an X-ray diffraction peak as described previously. In the present invention, for improving the low-temperature characteristic, it is necessary that the half width of the diffraction peak of the (003) plane be 0.30° or less and the half width of the diffraction peak of the (114) plane be 0.50° or less in an X-ray diffraction pattern attributed to a space group $P3_112$. The half width of the diffraction peak of the (003) plane is preferably 0.17° to 0.30°, and the half width of the diffraction peak of the (114) plane is preferably 0.35° to 0.50°. An active material, in which the composition ratio of metal elements contained in a solid solution of a lithium transition metal composite oxide satisfies $Li_{1+x-x}Na_yCo_aNi_bMn_cO_{2+d}$ ($0<y\leq0.1$, $0.4\leq c\leq0.7$, $x+a+b+c=1$, $0.1\leq x\leq0.25$, $-0.2\leq d\leq0.2$) and the half width is in the above-mentioned range, has a significantly increased discharge capacity and an improved initial efficiency, and shows an excellent low-temperature characteristic as shown in Examples 1 to 35 described later, and this effect cannot be conceived from the conventional art. Even though the composition of the active material is the same, the initial efficiency is reduced and the low-temperature characteristic is degraded, as shown in Comparative Example 15 described later, when the half width of the diffraction peak of the (003) plane is more than 0.30° or when the half width of the diffraction peak of the (114) plane is more than 0.50°.

For ensuring that the half width of the diffraction peak of the (003) plane is 0.30° or less and the half width of the diffraction peak of the (114) plane is 0.50° or less, it is necessary to keep the calcination temperature high.

As described above, the preferred calcination temperature varies depending on the oxygen release temperature of the active material, and it is therefore difficult to uniformly set a preferred range of the calcination temperature, but a range of 800° C. to 1050° C. is preferable because high characteristics can be exhibited.

However, mere selection of such a temperature that the half width of the diffraction peak of the main phase is reduced is not always sufficient for obtaining an active material having a high reversible capacity. That is, the half width of the diffraction peak is controlled by two factors: the amount of strain indicating the degree of inconsistency of a crystal lattice and the size of a crystallite as a minimum domain, and it is necessary to consider those factors separately for determining the degree of crystallinity from the half width. The inventors precisely analyzed the half width of the active material of the present invention to find that a strain remained in a lattice in the active material synthesized at a temperature of up to 700° C., and the strain could be mostly removed by synthesizing the active material at a higher temperature. The size of the crystallite was increased proportionally as the synthesis temperature was elevated. Therefore, in the composition of the active material of the present invention, a good discharge capacity was also obtained by aiming for particles in which the strain of the lattice is little present in a lattice, and the crystallite size is sufficiently grown. Specifically, it has been found that it is preferable to employ such a synthesis temperature (calcination temperature) that the amount of strain having an effect on the lattice constant is 2% or less, and the crystallite size is grown to 100 nm or more. When these particles are molded as an electrode and charge-discharge is performed, a change occurs clue to expansion and contraction, but it is preferable for effect of present invention that the crystallite size to be kept at 50 nm or more even in a charge-discharge process. That is, an active material having an excellent initial efficiency and a high reversible capacity can be obtained only by selecting the calcination temperature so as to be as close as possible to the above-described oxygen release temperature of the active material.

Also, for improving the initial efficiency, it is preferable that the crystallite size be as large as possible.

The nonaqueous electrolyte used in the lithium secondary battery according to the present invention is not limited, and those that are generally proposed to be used in lithium batteries and the like can be used. Examples of the nonaqueous solvent used in the nonaqueous electrolyte may include, but are not limited to, cyclic carbonates such as propylene carbonate, ethylene carbonate, butyrene carbonate, chloroethylene carbonate and vinylene carbonate; cyclic esters such as γ-butyrolactone and γ-valerolactone; chain carbonates such as dimethyl carbonate, diethyl carbonate and ethylmethyl carbonate; chain esters such as methyl formate, methyl acetate and methyl butyrate; tetrahydrofuran or derivatives thereof; ethers such as 1,3-dioxane, 1,4-dioxane, 1,2-dimethoxyethane, 1,4-dibutoxyethane and methyl diglyme; nitriles such as acetonitrile, benzonitrile; dioxolane or derivatives thereof; and ethylene sulfide, sulfolane, sultone or derivatives thereof alone or mixtures of two or more thereof.

Examples of the electrolyte salt used in the nonaqueous electrolyte include inorganic ion salts having one of lithium (Li), sodium (Na) and potassium (K), such as $LiClO_4$, $LiBF_4$, $LiAsF_6$, $LiPF_6$, $LiSCN$, $LiBr$, $LiI$, $Li_2SO_4$, $Li_2B_{10}Cl_{10}$, $NaClO_4$, $NaI$, $NaSCN$, $NaBr$, $KClO_4$, $KSCN$, and organic ion salts such as $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_6SO_2)_3$, $(CH_3)_4NBF_4$, $(CH_3)_4NBr$, $(C_2H_5)_4NClO_4$, $(C_2H_5)_4NI$, $(C_3H_7)_4NBr$, $(n-C_3H_9)_4NClO_4$, $(n-C_4H_9)_4NI$, $(C_2H_5)_4N$-maleate, $(C_2H_5)_4N$-benzoate, $(C_2H_5)_4N$-phtalate, lithium stearylsulfonate, lithium octylsulfonate and lithium dodecylbenzenesulfonate, these ionic compounds can be used alone or in combination of two or more thereof.

Further, by mixing $LiBF_4$ with a lithium salt having a perfluoroalkyl group, such as $LiN(C_2F_5SO_2)_2$, the viscosity of the electrolyte can be further reduced, so that the low-temperature characteristic can be further improved, and self discharge can be suppressed, thus being more desirable.

A ambient temperature molten salt or an ion liquid may be used as a nonaqueous electrolyte.

The concentration of the electrolyte salt in the nonaqueous electrolyte is preferably 0.1 mold to 5 mol/l, further preferably 0.5 mol/l to 2.5 mol/l for reliably obtaining a nonaqueous electrolyte battery having high battery characteristics.

The negative electrode material is not limited, and may be freely selected as long as it can precipitate or insert lithium ions. Examples thereof include titanium-based materials such as lithium titanate having a spinel-type crystal structure represented by $Li[Li_{1/3}Ti_{5/3}]O_4$, alloy-based materials such as Si-, Sb- and Sn-based alloy materials, lithium metal, lithium alloys (lithium metal-containing alloys such as lithium-silicon, lithium-aluminum, lithium-lead, lithium-tin, lithium-aluminum-tin, lithium-gallium and wood alloys), lithium composite oxides (lithium-titanium) and silicon oxide as well as alloys capable of insertion/extraction lithium, and carbon materials (e.g. graphite, hard carbon, low temperature-calcinated carbon and amorphous carbon).

It is desirable that the powder of the positive active material and the powder of the negative electrode material have an average particle size of 100 μm or less. Particularly, it is desirable that the powder of the positive active material has a size of 10 μm or less for the purpose of improving the power characteristic of the nonaqueous electrolyte battery. A crusher and a classifier are used for obtaining a powder in a predetermined shape. For example, a mortar, a ball mill, a sand mill, a vibration ball mill, a planet ball mill, a jet mill, a counter jet mill, a revolving airflow-type jet mill, a sieve or the like is used. At the time of crushing, wet crushing can also be used in which water, or an organic solvent such as hexane coexists. The classification method is not particularly limited, a sieve, an air classifier or the like is used as necessary in both dry and wet processes.

The positive active material and the negative electrode material which are main components of the positive electrode and the negative electrode have been described in detail above, but the aforementioned positive electrode and negative electrode may contain, in addition to the aforementioned main components, a conducting additive, a binding agent, a thickener, a filler and the like as other components.

The conducting additive is not limited as long as it is an electron-conductive material that has no adverse effect on battery performance, but normally conductive materials such as natural graphite (scaly graphite, flake graphite, earthy graphite, etc.), artificial graphite, carbon black, acetylene black, ketjen black, carbon whisker, carbon fibers, metal (copper, nickel, aluminum, silver, gold, etc.) powders, metal fibers and conductive ceramic materials can be included alone or as a mixture thereof.

Among them, acetylene black is desirable as a conducting additive from the viewpoint of electron conductivity and coating properties. The added amount of the conducting additive is preferably 0.1% by weight to 50% by weight, especially preferably 0.5% by weight to 30% by weight based on the total weight of the positive electrode or negative electrode. Particularly, use of acetylene black crushed into ultrafine particles of 0.1 to 0.5 μm is desirable because the required amount of carbon can be reduced. These mixing methods involve physical mixing, the ideal of which is homogeneous mixing. Thus, mixing can be carried out in a dry process or a wet process using a powder mixer such as a V-type mixer, an S-type mixer, a grinder, a ball mill or a planet ball mill.

As the binding agent, thermoplastic resins such as polytetrafluoroethylene (PTFE), polyvinylidene difluoride (PVDF), polyethylene and polypropylene, and polymers having rubber elasticity, such as ethylene-propylene-diene terpolymer (EPDM), sulfonated EPDM, styrene-butadiene rubber (SBR) and fluororubber can normally be used alone or as a mixture of two or more thereof. The added amount of the binding agent is preferably 1 to 50% by weight, especially preferably 2 to 30% by weight based on the total weight of the positive electrode or negative electrode.

The filler may be any material as long as it has no adverse effect on battery performance. A polyolefin-based polymer such as polypropylene or polyethylene, amorphous silica, alumina, zeolite, glass, carbon or the like is normally used. The added amount of the filler is preferably 30% by weight or less based on the total amount of the positive electrode or the negative electrode.

The positive electrode and the negative electrode are suitably prepared by mixing the aforementioned main components (positive active material in the positive electrode and negative electrode material in the negative electrode) and other materials to form a mixture, and mixing the mixture with an organic solvent such as N-methylpyrrolidone or toluene, followed by applying or contact-bonding the resulting mixed liquid onto a current collector that is described in detail below, and carrying out a heating treatment at a temperature of about 50° C. to 250° C. for about 2 hours. For the aforementioned coating method, for example, it is desirable to perform coating in any thickness and any shape using means such as roller coating by an applicator roll or the like, screen coating, a doctor blade system, spin coating or a bar coater, but the coating method is not limited thereto.

As a separator, it is preferable that a porous membrane, a nonwoven fabric or the like, which shows excellent high-rate discharge performance, be used alone or in combination. Examples of the material that forms the separator for a non-aqueous electrolyte battery include polyolefin-based resins represented by polyethylene, polypropylene and the like, polyester-based resins represented by polyethylene terephthalate, polybutyrene terephthalate and the like, polyvinylidene difluoride, vinylidene fluoride-hexafluoropropylene copolymers, vinylidene fluoride-perfluoro vinyl ether copolymers, vinylidene fluoride-tetrafluoroethylene copolymers, vinylidene fluoride-trifluoroethylene copolymers, vinylidene fluoride-fluoroethylene copolymers, vinylidene fluoride-hexafluoroacetone copolymers, vinylidene fluoride-ethylene copolymers, vinylidene fluoride-propylene copolymers, vinylidene fluoride-trifluoropropylene copolymers, vinylidene fluoride-tetrafluoroethylene-hexafluoropropylene copolymers and vinylidene fluoride-ethylene-tetrafluoroethylene copolymers.

The porosity of the separator is preferably 98% by volume or less from the viewpoint of the strength. The porosity is preferably 20% by volume or more from the viewpoint of charge-discharge characteristics.

For the separator, for example, a polymer gel formed of acrylonitrile, ethylene oxide, propylene oxide, methyl methacrylate, vinyl acetate, vinyl pyrrolidone or a polymer such as polyfluoride vinylidene and an electrolyte may be used. Use of the nonaqueous electrolyte in a gel form as described above is preferable from the viewpoint of being effective to prevent liquid leakage.

Further, for the separator, use of the above-mentioned porous membrane, nonwoven fabric or the like and the polymer gel in combination is desirable because liquid retainability of the electrolyte is improved. That is, a film with the surface and the microporous wall face of a polyethylene microporous membrane coated with a solvophilic polymer in a thickness of several μm or less, and an electrolyte is held within micropores of the film, so that the solvophilic polymer is formed into a gel.

Examples of the solvophilic polymer include, in addition to polyfluoride vinylidene, polymers in which an acrylate monomer having an ethylene oxide group, an ester group or the like, an epoxy monomer, a monomer having an isocyanate group, or the like is crosslinked. The monomer can be subjected to a crosslinking reaction by carrying out heating or using ultraviolet rays (UV) while using a radical initiator at the same time, or using active light rays such as electron beams (EB), or the like.

The configuration of the lithium secondary battery is not particularly limited, and examples thereof include a cylindrical battery, a prismatic battery and a flat battery having a positive electrode, a negative electrode and a roll-shaped separator.

EXAMPLES

Example 1

6.3200 g of cobalt sulfate heptahydrate, 14.773 g of nickel sulfate hexahydrate and 29.811 g of manganese sulfate pentahydrate were weighed, and dissolved in 300 ml of ion-exchanged water to prepare a 0.67 M aqueous sulfate solution of which the molar ratio of Co:Ni:Mn was 0.1:0.25:0.55. 750 ml of a solution was prepared by dissolving 6 g of hydrazine in ion-exchanged water, and transferred to a 2 l reaction tank. In this state, an Ar gas was bubbled for 30 min to sufficiently remove solved oxygen in the solution. The aqueous sulfate solution was added dropwise at a rate of 3 ml/min into the reaction tank set at 50° C., while the reaction tank was continuously stirred at a rotation speed of 700 rpm. A 8 M aqueous sodium hydroxide solution was added so that pH in the reaction tank was kept at pH 11.5. After completion of dropwise addition of the aqueous sulfate solution, stirring was stopped and in this state, the reaction tank was left standing for 12 hours or more, so that a coprecipitation hydroxide was sufficiently grain-grown. Next, the coprecipitation product was taken out by suction filtration, freed from attached sodium hydroxide using ion-exchanged water, and dried in an oven at 100° C. under normal pressure in an air atmosphere. After drying, the product was crushed by a mortar for several minutes so as to make the particle diameter even, so that a dry powder was obtained.

1.7970 g of this coprecipitation hydroxide was weighed, and 1.0099 g of lithium hydroxide monohydrate and 0.0121 g of sodium carbonate were added to prepare a mixed powder of which the molar ratio of Li:Na:(Co, Ni, Mn) was 1.09:0.01: 0.90. The mixed powder was adequately mixed using a mortar, and thereafter molded at a pressure of 6 MPa to thereby prepare a pellet having a diameter of 25 mm. The amount of each precursor powder subjected to pellet molding was determined by performing conversion calculation so that the mass as a product after synthesis would be 2 g. The prepared pellet was placed in an alumina boat having a total strength of about 100 mm, put into a box-type electric furnace, and calcinated at 1000° C. under normal pressure in an air atmosphere for 12 hours. The box-type electric furnace had an internal dimension of 10 cm (height), 20 cm (width) and 30 cm (depth), and provided with electrically heated wires at intervals of 20 cm in the width direction. After calcination, a heater was switched off, the alumina boat was naturally cooled as it was left standing in the furnace. As a result, the temperature of the furnace decreased to about 200° C. after 5 hours, but the subsequent temperature fall rate was slightly low. After elapse of a whole day and night, the pellet was taken after ensuring that the temperature of the furnace was not higher than 100° C., and crushed with a mortar to the extent that the particle diameter was made even.

For the crystal structure of the obtained active material, an $\alpha$-NaFeO$_2$ hexagonal structure was observed as a main phase and a diffraction peak at around 20 to 30° found in a Li[Li$_{1/3}$Mn$_{2/3}$]O$_2$-type monoclinic crystal was partly observed as a result of powder X-ray diffraction measurement using a CuK$\alpha$ radiation. For all diffraction lines thereof, crystal structure analysis by the Rietveld method was performed to find good agreement with a crystal structure model attributed to a space group P3$_1$12. The half widths in diffraction peaks of the (003) plane and the (114) plane at this time were 0.20° and 0.40°, respectively.

As a result of measurement of a specific surface area by a BET one-point method using a flow process nitrogen gas adsorption method (QUANTA CHROME manufactured by Yuasa Ionics Inc.), the specific surface area of the active material was 2.5 m$^2$/g.

The oxygen position parameter determined by the method described later was 0.263.

Examples 2 to 31

The active material according to the present invention was synthesized in the same manner as in Example 1 except that the composition of metal elements contained in the coprecipitation hydroxide precursor and the mixed amount of lithium hydroxide monohydrate and sodium carbonate were changed in accordance with the composition formula shown in Examples 2 to 31 in Table 1.

An $\alpha$-NaFeO$_2$ hexagonal structure was observed as a main phase and a diffraction peak at around 20 to 30° found in a Li[Li$_{1/3}$Mn$_{2/3}$]O$_2$-type monoclinic crystal was partly observed, as in the case of Example 1, as a result of powder X-ray diffraction measurement using a CuK$\alpha$ radiation. For all diffraction lines thereof, crystal structure analysis by the Rietveld method was performed to find good agreement with a crystal structure model attributed to a space group P3$_1$12. The half width of the diffraction peak of the (003) plane, which was determined from a diffraction peak at 18.6±1°, was 0.19 to 0.21°, and the half width of the diffraction peak of the (114) plane from a diffraction peak at 44.1±1° was 0.39 to 0.41°.

As a result of measurement of a specific surface area by a BET one-point method using a flow process-nitrogen gas adsorption method, the specific surface area of the active material fell within a range of 2.3 to 2.7 m$^2$/g.

The oxygen position parameter determined by the method described later fell within a range of 0.261 to 0.263.

Examples 32 to 34

The active material according to the present invention was synthesized in the same manner as in Example 1 except that the composition of metal elements contained in the coprecipitation hydroxide precursor and the mixed amount of lithium hydroxide monohydrate and sodium carbonate were made consistent with the composition formula shown in Example 10 in Table 1, and the calcination temperature of the pellet was changed. The calcination temperature was 1050° C. in Example 32, the calcination temperature was 900° C. in Example 33, and the calcination temperature was 800° C. in Example 34.

An $\alpha$-NaFeO$_2$ hexagonal structure was observed as a main phase and a diffraction peak at around 20 to 30° found in a Li[Li$_{1/3}$Mn$_{2/3}$]O$_2$-type monoclinic crystal was partly observed, all as in the case of Example 1, as a result of powder X-ray diffraction measurement using a CuK$\alpha$ radiation. For all diffraction lines thereof, crystal structure analysis by the Rietveld method was performed to find good agreement with a crystal structure model attributed to a space group P3$_1$12. In these X-ray diffraction patterns, the half widths in diffraction peaks of the (003) plane and the (114) plane were significantly changed, but the half width was 0.30° or less for the (003) diffraction peak, and 0.50° or less for the (114) diffraction peak.

As a result of measurement of a specific surface area by a BET one-point method using a flow process-nitrogen gas adsorption method, the specific surface area of the active material fell within a range of no more than 3.7 m$^2$/g.

The oxygen position parameter determined by the method described later was all 0.262.

Examples 35 to 38

The active material according to the present invention was synthesized in the same manner as in Example 1 except that the composition of metal elements contained in the coprecipitation hydroxide precursor and the mixed amount of lithium hydroxide monohydrate and sodium carbonate were made consistent with the composition formula shown in Example 10 in Table 1, and the active material obtained after calcination was subjected to a ball milling crushing treatment. For conditions for the ball-milling crushing treatment, the treatment was carried at a rotation speed of 150 rpm for 5 min in Example 35, for 10 min in Example 36, for 20 min in Example 37 and for 30 min in Example 38 using an alumina ball having a size of 10 mm $\phi$.

An $\alpha$-NaFeO$_2$ hexagonal structure was observed as a main phase and a diffraction peak at around 20 to 30° found in a Li[Li$_{1/3}$Mn$_{2/3}$]O$_2$-type monoclinic crystal was partly observed, all as in the case of Example 1, as a result of powder X-ray diffraction measurement using a CuK$\alpha$ radiation. For all diffraction lines thereof, crystal structure analysis by the Rietveld method was performed to find good agreement with a crystal structure model attributed to a space group P3$_1$12. In these X-ray diffraction patterns, the half widths in diffraction peaks of the (003) plane and the (114) plane were significantly changed, but the half width was 0.23° or less for the (003) diffraction peak, and 0.45° or less for the (114) diffraction peak.

As a result of measurement of a specific surface area by a BET one-point method using a flow process-nitrogen gas adsorption method, the specific surface area notably varied from one to another, but fell within a range of no more than 6.1 m²/g.

Examples 39 to 40

The active material according to the present invention was synthesized in the same manner as in Example 1 except that the composition of metal elements contained in the coprecipitation hydroxide precursor and the mixed amount of lithium hydroxide monohydrate and sodium carbonate were made consistent with the composition formula shown in Example 10 in Table 1, and the speed of dropwise addition of an aqueous sulfate solution added dropwise in preparation of the coprecipitation hydroxide was changed. The speed of dropwise addition of the aqueous sulfate solution was 5 ml/min in Example 39, and 10 ml/min in Example 40.

An α-NaFeO₂ hexagonal structure was observed as a main phase and a diffraction peak at around 20 to 30° found in a Li[Li$_{1/3}$Mn$_{2/3}$]O$_2$-type monoclinic crystal was partly observed, all as in the case of Example 1, as a result of powder X-ray diffraction measurement using a CuKα radiation. For all diffraction lines thereof, crystal structure analysis by the Rietveld method was performed to find good agreement with a crystal structure model attributed to a space group P3$_1$12. In these X-ray diffraction patterns, the half width of the diffraction peak of the (003) plane was 0.17° and the half width of the diffraction peak of the (114) plane was 0.36° in Example 39, and the half width of the diffraction peak of the (003) plane was 0.23° and the half width of the diffraction peak of the (114) plane was 0.45° in Example 40.

The oxygen position parameter determined by the method described later was 0.263 in Example 39, and 0.264 in Example 40.

Comparative Examples 1 to 14

Each active material was synthesized in the same manner as in Example 1 except that the composition of metal elements contained in the coprecipitation hydroxide precursor and the mixed amount of lithium hydroxide monohydrate and sodium carbonate were changed in accordance with the composition formulae shown in Comparative Examples 1 to 14 in Table 1.

In Comparative examples 1, 2 and 5 to 14, an α-NaFeO₂ hexagonal structure was observed as a main phase and a diffraction peak at around 20 to 80° found in a Li[Li$_{1/3}$Mn$_{2/3}$]O$_2$-type monoclinic crystal was partly observed, as in the case of Example 1, as a result of powder X-ray diffraction measurement using a CuKα radiation. For all diffraction lines thereof, crystal structure analysis by the Rietveld method was performed to find good agreement with a crystal structure model attributed to a space group P3$_1$12. For Comparative Examples 3 and 4, a diffraction peak at around 20 to 30° as found in a Li[Li$_{1/3}$Mn$_{2/3}$]O$_2$-type monoclinic crystal was not observed, and the space group was attributable as more symmetric R-3m.

As in the case of Example 1, in these X-ray diffraction patterns, the half widths in diffraction peaks of the (003) plane and the (114) plane were significantly changed. But the half width was 0.21° or less for the (003) diffraction peak, and 0.41° or less for the (114) diffraction peak. In this regard, the (114) diffraction peaks in Comparative Examples 3 and 4 correspond to the (104) diffraction peak in the space group R-3m.

As a result of measurement of a specific surface area by a BET one-point method using a flow process-nitrogen gas adsorption method, the specific surface area of the active material fell within a range of no more than 2.6 m²/g.

The oxygen position parameter determined by the method described later was 0.266 to 0.267 in Comparative Examples 3 and 4, and 0.262 in all of Comparative Examples 1, 2 and 5 to 14.

Comparative Example 15

An active material was synthesized in the same manner as in Example 1 except that the composition of metal elements contained in the coprecipitation hydroxide precursor and the mixed amount of lithium hydroxide monohydrate and sodium carbonate were made consistent with the composition formula shown in Example 10 in Table 1, and the calcination temperature of the pellet was changed to 700° C.

An α-NaFeO₂ hexagonal structure was observed as a main phase and a diffraction peak at around 20 to 30° found in a Li[Li$_{1/3}$Mn$_{2/3}$]O$_2$-type monoclinic crystal was partly observed, as in the case of Example 1, as a result of powder X-ray diffraction measurement using a CuKα radiation. For all diffraction lines thereof, crystal structure analysis by the Rietveld method was performed to find good agreement with a crystal structure model attributed to a space group P3$_1$12. In this X-ray diffraction pattern, the half widths in the diffraction peaks of the (003) plane and the (114) plane were 0.32° and 0.54°, respectively.

As a result of measurement of a specific surface area by a BET one-point method using a flow process-nitrogen gas adsorption method, the specific surface area of the active material was 4.5 m²/g.

The oxygen position parameter determined by the method described later was 0.262.

Comparative Example 16

An active material was synthesized in the same manner as in Example 1 except that the composition of metal elements contained in the coprecipitation hydroxide precursor and the mixed amount of lithium hydroxide monohydrate and sodium carbonate were made consistent with the composition formula shown in Example 10 in Table 1, and the speed of dropwise addition of a sulfate added dropwise in preparation of the coprecipitation hydroxide was changed to 60 ml/min.

An α-NaFeO₂ hexagonal structure was observed as a main phase and a diffraction peak at around 20 to 30° found in a Li[Li$_{1/3}$Mn$_{2/3}$]O$_2$-type monoclinic crystal was partly observed, as in the case of Example 1, as a result of powder X-ray diffraction measurement using a CuKα radiation. For all diffraction lines thereof, crystal structure analysis by the Rietveld method was performed to find good agreement with a crystal structure model attributed to a space group P3$_1$12. In this X-ray diffraction pattern, the half widths in diffraction peaks of the (003) plane and the (114) plane were significantly changed, but the half width was 0.23° for the (003) diffraction peak, and 0.44° for the (114) diffraction peak.

The oxygen position parameter determined by the method described later was 0.266.

Comparative Example 17

With no coprecipitation hydroxide precursor involved, powders of cobalt hydroxide, nickel hydroxide and manganese dioxide were used as metal element raw materials (Co, Ni, Mn) to synthesize an active material of the composition shown in Example 10 in Table 1 by a solid phase method, i.e. by mixing/calcinating these powders with lithium hydroxide monohydrate and sodium carbonate. The active material was synthesized in the same manner as in Example 1 except for the step of preparing the coprecipitation precursor.

An $\alpha$-NaFeO$_2$ hexagonal structure was observed as a main phase and a diffraction peak at around 20 to 30° found in a Li[Li$_{1/3}$Mn$_{2/3}$]O$_2$-type monoclinic crystal was partly observed, as in the case of Example 1, as a result of powder X-ray diffraction measurement using a CuK$\alpha$ radiation. For all diffraction lines thereof, crystal structure analysis by the Rietveld method was performed to find good agreement with a crystal structure model attributed to a space group P3$_1$12. In this X-ray diffraction pattern, the half width was 0.21° for the (003) diffraction peak, and 0.42° for the (114) diffraction peak.

The oxygen position parameter determined by the method described later was 0.267.

(Assembly of Lithium Secondary Battery)

A lithium secondary battery was assembled by the following procedure using the active material of each of Examples 1 to 40 and Comparative examples 1 to 17 as a positive active material for a lithium secondary material, and battery characteristics were evaluated.

The active material, acetylene black (AB) and polyvinylidene difluoride (PVdF) were mixed at a ratio of 85:8:7 in terms of a weight ratio, N-methylpyrrolidone was added as a dispersion medium, and the mixture was mixed and dispersed to prepare a applicating solution. For PVdF, solid weight conversion calculation was performed using a liquid having a solid dissolved and dispersed therein. The applicating solution was applied to an aluminum foil current collector having a thickness of 20 μm to prepare a positive electrode plate. The electrode weight and thickness were equalized so that test conditions were the same in all the batteries.

For the counter electrode, a lithium metal was used as a negative electrode for the purpose of observing an independent behavior of the positive electrode. The lithium metal was firmly attached to a nickel foil current collector. However, an adjustment was made so that the capacity of the lithium secondary battery would adequately regulate the positive electrode.

As an electrolyte solution, a solution obtained by dissolving LiPF$_6$, in a concentration of 1 mol/l, in a mixed solvent of EC/EMC/DMC in a volume ratio of 6:7:7, was used. As a separator, a microporous membrane made of polypropylene, the surface of which was modified with polyacrylate to improve electrolyte solution retainability, was used. A nickel plate, to which a lithium metal foil was attached, was used as a reference electrode. As a outer case, a metal resin composite film made of polyethylene terephthalate (15 μm)/aluminum foil (50 μm)/metal-adhesive polypropylene film (50 μm) was used. In a dry room with a dew point of −40° C. or lower, the electrode was stored such that the open ends of a terminal, a negative electrode terminal and a reference electrode terminal were externally exposed, and fusion margins with the inner surfaces of the aforementioned metal resin composite films facing each other were airtightly sealed except a portion forming an electrolyte solution filling hole. The electrolyte solution in an amount enough for the assembled battery not to suffer from a liquid shortage was injected in an equal amount into each battery from the electrolyte solution filling hole, and thereafter the electrolyte solution filling hole was thermally sealed under a reduced pressure to assemble a lithium secondary battery.

(Initial Charge-Discharge Step)

A plurality of lithium secondary batteries prepared for the active material of each of Examples and Comparative Examples as described above were subjected to an initial charge-discharge step under an environment of 25° C. Voltage control was all performed for the positive electrode potential. Charge was constant current-constant voltage charge with a current of 0.1 ItA and a voltage of 4.6 V, and the charge termination condition was set at a time point at which the current value decreased to 1/6. Discharge was constant current discharge with a current of 0.1 ItA and a final voltage of 2.0 V. This cycle was performed twice. At this time, a rest time of 30 minutes was set each after charge and after discharge. The value of "(discharge electrical amount)/(charge electrical amount)×100" shown as a percentage at first cycle was recorded as an "initial efficiency (%)".

(Charge-Discharge Test)

Subsequently, a charge-discharge test was conducted with the charge voltage changed. Voltage control was all performed for the positive electrode potential. Conditions for this test were same as those for the aforementioned initial charge-discharge step except that the charge voltage was 4.3 V (vs. Li/Li$^+$). A rest time of 30 minutes was set after charge and after discharge. The discharge electrical amount at this time was recorded as a "discharge capacity (mAh/g)".

(Measurement of Oxygen Position Parameter)

From lithium batteries subjected to the initial charge-discharge step, the lithium batteries of Examples and Comparative Examples were picked up on a one-by-one basis, and used for measurement of the oxygen position parameter of the active material. First, a positive electrode plate was taken out from a battery outer case within an Ar box, dipped in DMC to wash off an electrolyte solution attached on the positive electrode plate, and thereafter dried. This positive electrode plate was subjected to X-ray diffraction measurement with a applied mixture to a current collector. For all diffraction lines obtained, crystal structure analysis by the Rietveld method was performed. For the program used in Rietveld analysis, RIETAN-2000 ((Izumi et al., Mat. Sci. Forum, 321-324, 198 (2000)) was used. The coordinate, the oxygen parameter and the isotropic thermal vibration parameter were refined, at each atom position, with the crystal structure model of the positive active material as a space group P3$_1$12. Actual data was refined to the extent that the S value showing a difference between itself and the crystal structure model became less than 1.8 using diffraction data at 15 to 85° (CuK$\alpha$). In the crystal structure model of the space group P3$_1$12, there are three oxygen positions of O1, O2 and O3, but here these three oxygen position parameters were determined, and the average thereof was calculated.

(Low-Temperature Characteristic Test)

In the batteries subjected to the initial charge-discharge step, a charge-discharge test was conducted with the charge voltage and the environmental temperature changed. Voltage control was all performed for the positive electrode potential. Conditions for this test were same as those for the initial charge-discharge step except that charge was constant current-constant voltage charge with a charge voltage of 4.3 V, and the environmental temperature was 0° C. The discharge capacity at this time was recorded as a "low-temperature capacity (mAh/g)".

The composition, half width, specific surface area, initial efficiency, discharge capacity (capacity at 0.1 ItA, 25° C.), oxygen position parameter and low-temperature capacity for each active material are shown in Tables 1 and 2.

TABLE 1

| | Composition | | | | | | | Half width | |
|---|---|---|---|---|---|---|---|---|---|
| | Composition formula | x + y | y | x | a | b | c | (003) | (114) |
| Example 1 | $Li_{1.09}Na_{0.01}Co_{0.1}Ni_{0.25}Mn_{0.55}O_2$ | 0.11 | 0.01 | 0.1 | 0.1 | 0.25 | 0.55 | 0.20° | 0.40° |
| Example 2 | $Li_{1.1}Na_{0.01}Co_{0.1}Ni_{0.24}Mn_{0.55}O_2$ | 0.12 | 0.01 | 0.11 | 0.1 | 0.24 | 0.55 | 0.20° | 0.40° |
| Example 3 | $Li_{1.09}Na_{0.02}Co_{0.1}Ni_{0.24}Mn_{0.55}O_2$ | 0.13 | 0.02 | 0.11 | 0.1 | 0.24 | 0.55 | 0.20° | 0.40° |
| Example 4 | $Li_{1.1}Na_{0.02}Co_{0.1}Ni_{0.23}Mn_{0.55}O_2$ | 0.14 | 0.02 | 0.12 | 0.1 | 0.23 | 0.55 | 0.20° | 0.40° |
| Example 5 | $Li_{1.11}Na_{0.02}Co_{0.1}Ni_{0.22}Mn_{0.55}O_2$ | 0.15 | 0.02 | 0.13 | 0.1 | 0.22 | 0.55 | 0.20° | 0.40° |
| Example 6 | $Li_{1.15}Na_{0.02}Co_{0.1}Ni_{0.17}Mn_{0.55}O_2$ | 0.2 | 0.02 | 0.18 | 0.1 | 0.17 | 0.55 | 0.21° | 0.40° |
| Example 7 | $Li_{1.21}Na_{0.02}Co_{0.1}Ni_{0.12}Mn_{0.55}O_2$ | 0.25 | 0.02 | 0.23 | 0.1 | 0.12 | 0.55 | 0.20° | 0.40° |
| Example 8 | $Li_{1.23}Na_{0.02}Co_{0.1}Ni_{0.1}Mn_{0.55}O_2$ | 0.27 | 0.02 | 0.25 | 0.1 | 0.1 | 0.55 | 0.20° | 0.40° |
| Example 9 | $Li_{1.18}Na_{0.01}Co_{0.1}Ni_{0.16}Mn_{0.55}O_2$ | 0.2 | 0.01 | 0.19 | 0.1 | 0.16 | 0.55 | 0.20° | 0.40° |
| Example 10 | $Li_{1.16}Na_{0.02}Co_{0.1}Ni_{0.17}Mn_{0.55}O_2$ | 0.2 | 0.02 | 0.18 | 0.1 | 0.17 | 0.55 | 0.20° | 0.41° |
| Example 11 | $Li_{1.14}Na_{0.03}Co_{0.1}Ni_{0.18}Mn_{0.55}O_2$ | 0.2 | 0.03 | 0.17 | 0.1 | 0.18 | 0.55 | 0.20° | 0.40° |
| Example 12 | $Li_{1.1}Na_{0.05}Co_{0.1}Ni_{0.2}Mn_{0.55}O_2$ | 0.2 | 0.05 | 0.15 | 0.1 | 0.2 | 0.55 | 0.20° | 0.40° |
| Example 13 | $Li_{1.06}Na_{0.07}Co_{0.1}Ni_{0.22}Mn_{0.55}O_2$ | 0.2 | 0.07 | 0.13 | 0.1 | 0.22 | 0.55 | 0.20° | 0.39° |
| Example 14 | $LiNa_{0.1}Co_{0.1}Ni_{0.25}Mn_{0.55}O_2$ | 0.2 | 0.1 | 0.1 | 0.1 | 0.25 | 0.55 | 0.20° | 0.40° |
| Example 15 | $Li_{1.23}Na_{0.01}Co_{0.1}Ni_{0.11}Mn_{0.55}O_2$ | 0.25 | 0.01 | 0.24 | 0.1 | 0.11 | 0.55 | 0.20° | 0.40° |
| Example 16 | $Li_{1.21}Na_{0.02}Co_{0.1}Ni_{0.12}Mn_{0.55}O_2$ | 0.25 | 0.02 | 0.23 | 0.1 | 0.12 | 0.55 | 0.19° | 0.40° |
| Example 17 | $Li_{1.19}Na_{0.03}Co_{0.1}Ni_{0.13}Mn_{0.55}O_2$ | 0.25 | 0.03 | 0.22 | 0.1 | 0.13 | 0.55 | 0.20° | 0.40° |
| Example 18 | $Li_{1.15}Na_{0.05}Co_{0.1}Ni_{0.15}Mn_{0.55}O_2$ | 0.25 | 0.05 | 0.2 | 0.1 | 0.15 | 0.55 | 0.20° | 0.40° |
| Example 19 | $Li_{1.11}Na_{0.07}Co_{0.1}Ni_{0.17}Mn_{0.55}O_2$ | 0.25 | 0.07 | 0.18 | 0.1 | 0.17 | 0.55 | 0.20° | 0.39° |
| Example 20 | $Li_{1.05}Na_{0.1}Co_{0.1}Ni_{0.2}Mn_{0.55}O_2$ | 0.25 | 0.1 | 0.15 | 0.1 | 0.2 | 0.55 | 0.20° | 0.40° |
| Example 21 | $Li_{1.2}Na_{0.05}Co_{0.1}Ni_{0.1}Mn_{0.55}O_2$ | 0.3 | 0.05 | 0.25 | 0.1 | 0.1 | 0.55 | 0.20° | 0.40° |
| Example 22 | $Li_{1.18}Na_{0.07}Co_{0.1}Ni_{0.12}Mn_{0.55}O_2$ | 0.3 | 0.07 | 0.23 | 0.1 | 0.12 | 0.55 | 0.20° | 0.40° |
| Example 23 | $Li_{1.1}Na_{0.1}Co_{0.1}Ni_{0.15}Mn_{0.55}O_2$ | 0.3 | 0.1 | 0.2 | 0.1 | 0.15 | 0.55 | 0.20° | 0.40° |
| Example 24 | $Li_{1.16}Na_{0.02}Co_{0.1}Ni_{0.32}Mn_{0.4}O_2$ | 0.2 | 0.02 | 0.18 | 0.1 | 0.32 | 0.4 | 0.20° | 0.40° |
| Example 25 | $Li_{1.16}Na_{0.02}Co_{0.1}Ni_{0.22}Mn_{0.5}O_2$ | 0.2 | 0.02 | 0.18 | 0.1 | 0.22 | 0.5 | 0.20° | 0.40° |
| Example 26 | $Li_{1.16}Na_{0.02}Co_{0.1}Ni_{0.12}Mn_{0.6}O_2$ | 0.2 | 0.02 | 0.18 | 0.1 | 0.12 | 0.6 | 0.21° | 0.40° |
| Example 27 | $Li_{1.16}Na_{0.02}Co_{0.1}Ni_{0.02}Mn_{0.7}O_2$ | 0.2 | 0.02 | 0.18 | 0.1 | 0.02 | 0.7 | 0.20° | 0.41° |
| Example 28 | $Li_{1.16}Na_{0.02}Co_{0.3}Ni_{0.12}Mn_{0.4}O_2$ | 0.2 | 0.02 | 0.18 | 0.3 | 0.12 | 0.4 | 0.20° | 0.40° |
| Example 29 | $Li_{1.16}Na_{0.02}Co_{0.2}Ni_{0.12}Mn_{0.5}O_2$ | 0.2 | 0.02 | 0.18 | 0.2 | 0.12 | 0.5 | 0.20° | 0.40° |
| Example 30 | $Li_{1.16}Na_{0.02}Co_{0.1}Ni_{0.12}Mn_{0.6}O_2$ | 0.2 | 0.02 | 0.18 | 0.1 | 0.12 | 0.6 | 0.20° | 0.40° |
| Example 31 | $Li_{1.16}Na_{0.02}Ni_{0.12}Mn_{0.7}O_2$ | 0.2 | 0.02 | 0.18 | 0 | 0.12 | 0.7 | 0.20° | 0.40° |
| Example 32 | $Li_{1.16}Na_{0.02}Co_{0.1}Ni_{0.17}Mn_{0.55}O_2$ | 0.2 | 0.02 | 0.18 | 0.1 | 0.17 | 0.55 | 0.17° | 0.35° |
| Example 33 | $Li_{1.16}Na_{0.02}Co_{0.1}Ni_{0.17}Mn_{0.55}O_2$ | 0.2 | 0.02 | 0.18 | 0.1 | 0.17 | 0.55 | 0.25° | 0.45° |
| Example 34 | $Li_{1.16}Na_{0.02}Co_{0.1}Ni_{0.17}Mn_{0.55}O_2$ | 0.2 | 0.02 | 0.18 | 0.1 | 0.17 | 0.55 | 0.30° | 0.50° |
| Example 35 | $Li_{1.16}Na_{0.02}Co_{0.1}Ni_{0.17}Mn_{0.55}O_2$ | 0.2 | 0.02 | 0.18 | 0.1 | 0.17 | 0.55 | 0.17° | 0.36° |
| Example 36 | $Li_{1.16}Na_{0.02}Co_{0.1}Ni_{0.17}Mn_{0.55}O_2$ | 0.2 | 0.02 | 0.18 | 0.1 | 0.17 | 0.55 | 0.18° | 0.39° |
| Example 37 | $Li_{1.16}Na_{0.02}Co_{0.1}Ni_{0.17}Mn_{0.55}O_2$ | 0.2 | 0.02 | 0.18 | 0.1 | 0.17 | 0.55 | 0.21° | 0.42° |
| Example 38 | $Li_{1.16}Na_{0.02}Co_{0.1}Ni_{0.17}Mn_{0.55}O_2$ | 0.2 | 0.02 | 0.18 | 0.1 | 0.17 | 0.55 | 0.23° | 0.45° |
| Example 39 | $Li_{1.16}Na_{0.02}Co_{0.1}Ni_{0.17}Mn_{0.55}O_2$ | 0.2 | 0.02 | 0.18 | 0.1 | 0.17 | 0.55 | 0.17° | 0.36° |
| Example 40 | $Li_{1.16}Na_{0.02}Co_{0.1}Ni_{0.17}Mn_{0.55}O_2$ | 0.2 | 0.02 | 0.18 | 0.1 | 0.17 | 0.55 | 0.23° | 0.45° |

| | Specific surface area $m^2/g$ | Initial efficiency % | Discharge capacity mAh/g | Oxygen position parameter | Low-temperature capacity mAh/g |
|---|---|---|---|---|---|
| Example 1 | 2.5 | 92 | 184 | 0.263 | 152 |
| Example 2 | 2.5 | 91 | 188 | 0.262 | 155 |
| Example 3 | 2.4 | 90 | 190 | 0.262 | 157 |
| Example 4 | 2.5 | 90 | 210 | 0.262 | 160 |
| Example 5 | 2.5 | 90 | 214 | 0.262 | 165 |
| Example 6 | 2.6 | 88 | 222 | 0.262 | 174 |
| Example 7 | 2.5 | 88 | 217 | 0.262 | 170 |
| Example 8 | 2.3 | 87 | 209 | 0.262 | 165 |
| Example 9 | 2.5 | 88 | 223 | 0.262 | 173 |
| Example 10 | 2.6 | 89 | 221 | 0.262 | 172 |
| Example 11 | 2.5 | 89 | 222 | 0.262 | 173 |
| Example 12 | 2.4 | 90 | 221 | 0.261 | 170 |
| Example 13 | 2.5 | 90 | 220 | 0.262 | 171 |
| Example 14 | 2.6 | 90 | 218 | 0.262 | 170 |
| Example 15 | 2.5 | 88 | 215 | 0.262 | 170 |
| Example 16 | 2.5 | 89 | 215 | 0.262 | 168 |
| Example 17 | 2.3 | 89 | 216 | 0.262 | 168 |
| Example 18 | 2.5 | 89 | 213 | 0.262 | 166 |
| Example 19 | 2.4 | 90 | 212 | 0.262 | 167 |
| Example 20 | 2.5 | 90 | 210 | 0.262 | 165 |
| Example 21 | 2.7 | 88 | 201 | 0.262 | 156 |
| Example 22 | 2.5 | 88 | 198 | 0.261 | 155 |
| Example 23 | 2.5 | 89 | 195 | 0.262 | 155 |
| Example 24 | 2.6 | 91 | 190 | 0.262 | 150 |
| Example 25 | 2.5 | 91 | 211 | 0.262 | 163 |
| Example 26 | 2.5 | 90 | 223 | 0.262 | 175 |
| Example 27 | 2.6 | 89 | 208 | 0.262 | 171 |
| Example 28 | 2.5 | 91 | 192 | 0.262 | 152 |
| Example 29 | 2.4 | 90 | 210 | 0.262 | 162 |
| Example 30 | 2.5 | 90 | 222 | 0.262 | 174 |

TABLE 1-continued

|  | | | | | |
|---|---|---|---|---|---|
| Example 31 | 2.5 | 89 | 205 | 0.261 | 169 |
| Example 32 | 1.7 | 89 | 224 | 0.262 | 178 |
| Example 33 | 3.1 | 90 | 217 | 0.262 | 169 |
| Example 34 | 3.7 | 89 | 206 | 0.262 | 162 |
| Example 35 | 3.9 | 89 | 213 | | |
| Example 36 | 4.4 | 89 | 209 | | |
| Example 37 | 5.6 | 88 | 205 | | |
| Example 38 | 6.1 | 85 | 201 | | |
| Example 39 | | | | 0.263 | 164 |
| Example 40 | | | | 0.265 | 157 |

TABLE 2

| | Composition | | | | | | | Half width | |
|---|---|---|---|---|---|---|---|---|---|
| | Composition formula | x + y | y | x | a | b | c | (003) | (114) |
| Comparative Example 1 | $Li_{1.05}Na_{0.03}Co_{0.1}Ni_{0.27}Mn_{0.55}O_2$ | 0.11 | 0.03 | 0.08 | 0.1 | 0.27 | 0.55 | 0.20° | 0.40° |
| Comparative Example 2 | $Li_{1.24}Na_{0.03}Co_{0.1}Ni_{0.08}Mn_{0.55}O_2$ | 0.3 | 0.03 | 0.27 | 0.1 | 0.08 | 0.55 | 0.20° | 0.40° |
| Comparative Example 3 | $LiCo_{0.1}Ni_{0.45}Mn_{0.45}O_2$ | 0 | 0 | 0 | 0.1 | 0.45 | 0.45 | 0.20° | 0.40° |
| Comparative Example 4 | $Li_{0.9}Na_{0.05}Co_{0.1}Ni_{0.5}Mn_{0.45}O_2$ | 0 | 0.05 | −0.05 | 0.1 | 0.5 | 0.45 | 0.20° | 0.40° |
| Comparative Example 5 | $Li_{1.2}Co_{0.1}Na_{0.15}Mn_{0.55}O_2$ | 0.2 | 0 | 0.2 | 0.1 | 0.15 | 0.55 | 0.20° | 0.40° |
| Comparative Example 6 | $Li_{0.96}Na_{0.12}Co_{0.1}Ni_{0.27}Mn_{0.55}O_2$ | 0.2 | 0.12 | 0.08 | 0.1 | 0.27 | 0.55 | 0.20° | 0.40° |
| Comparative Example 7 | $Li_{1.25}Co_{0.1}Ni_{0.1}Mn_{0.55}O_2$ | 0.25 | 0 | 0.25 | 0.1 | 0.1 | 13.55 | 0.20° | 0.40° |
| Comparative Example 8 | $Li_{1.01}Na_{0.12}Co_{0.1}Ni_{0.22}Mn_{0.55}O_2$ | 0.25 | 0.12 | 0.13 | 0.1 | 0.22 | 0.55 | 0.20° | 0.40° |
| Comparative Example 9 | $Li_{1.3}Co_{0.1}Ni_{0.05}Mn_{0.55}O_2$ | 0.3 | 0 | 0.3 | 0.1 | 0.05 | 0.55 | 0.20° | 0.40° |
| Comparative Example 10 | $Li_{1.06}Na_{0.12}Co_{0.1}Ni_{0.17}Mn_{0.55}O_2$ | 0.3 | 0.12 | 0.18 | 0.1 | 0.17 | 0.55 | 0.20° | 0.40° |
| Comparative Example 11 | $Li_{1.13}Na_{0.01}Co_{0.1}Ni_{0.41}Mn_{0.35}O_2$ | 0.15 | 0.01 | 0.14 | 0.1 | 0.41 | 0.35 | 0.20° | 0.40° |
| Comparative Example 12 | $Li_{1.13}Na_{0.01}Co_{0.05}Ni_{0.06}Mn_{0.75}O_2$ | 0.15 | 0.01 | 0.14 | 0.05 | 0.06 | 0.75 | 0.20° | 0.40° |
| Comparative Example 13 | $Li_{1.18}Na_{0.01}Co_{0.1}Ni_{0.38}Mn_{0.35}O_2$ | 0.2 | 0.01 | 0.19 | 0.1 | 0.36 | 0.35 | 0.20° | 0.40° |
| Comparative Example 14 | $Li_{1.18}Na_{0.01}Co_{0.05}Ni_{0.01}Mn_{0.75}O_2$ | 0.2 | 0.01 | 0.19 | 0.05 | 0.01 | 0.75 | 0.20° | 0.40° |
| Comparative Example 15 | $Li_{1.16}Na_{0.02}Co_{0.1}Ni_{0.17}Mn_{0.55}O_2$ | 0.2 | 0.02 | 0.18 | 0.1 | 0.17 | 0.55 | 0.32° | 0.54° |
| Comparative Example 16 | $Li_{1.16}Na_{0.02}Co_{0.1}Ni_{0.17}Mn_{0.55}O_2$ | 0.2 | 0.02 | 0.18 | 0.1 | 0.17 | 0.55 | 0.32 | 0.54 |
| Comparative Example 17 | $Li_{1.16}Na_{0.02}Co_{0.1}Ni_{0.17}Mn_{0.55}O_2$ | 0.2 | 0.02 | 0.18 | 0.1 | 0.17 | 0.55 | 0.23 | 0.44 |

| | Specific surface area m²/g | Initial efficiency % | Discharge capacity mAh/g | Oxygen position parameter | Low-temperature capacity mAh/g |
|---|---|---|---|---|---|
| Comparative Example 1 | 2.5 | 88 | 150 | 0.262 | 142 |
| Comparative Example 2 | 2.4 | 87 | 168 | 0.262 | 125 |
| Comparative Example 3 | 2.5 | 77 | 150 | 0.267 | 135 |
| Comparative Example 4 | 2.5 | 77 | 141 | 0.266 | 124 |
| Comparative Example 5 | 2.5 | 77 | 188 | 0.262 | 148 |
| Comparative Example 6 | 2.5 | 70 | 159 | 0.262 | 143 |
| Comparative Example 7 | 2.6 | 68 | 185 | 0.262 | 146 |
| Comparative Example 8 | 2.6 | 63 | 150 | 0.262 | 142 |
| Comparative Example 9 | 2.4 | 65 | 160 | 0.262 | 144 |
| Comparative Example 10 | 2.4 | 56 | 152 | 0.262 | 139 |

TABLE 2-continued

| | | | | | |
|---|---|---|---|---|---|
| Comparative Example 11 | 2.5 | 72 | 146 | 0.262 | 140 |
| Comparative Example 12 | 2.4 | 66 | 134 | 0.262 | 133 |
| Comparative Example 13 | 2.5 | 71 | 145 | 0.262 | 142 |
| Comparative Example 14 | 2.6 | 67 | 133 | 0.262 | 134 |
| Comparative Example 15 | 4.5 | 75 | 159 | 0.262 | 118 |
| Comparative Example 16 | | | | 0.266 | 113 |
| Comparative Example 17 | | | | 0.267 | 102 |

The active materials of Examples 1 to 8 are ones in which the composition for the Li substitution content x at the transition metal site is changed while the Na substitution content y is kept almost constant. In all the active materials of Examples 1 to 8 and Comparative examples 1 and 2, the oxygen position parameter is 0.264 or less, and the half width of the diffraction peak shows an almost constant value within the range defined in the present invention such that the half width of the diffraction peak of the (003) plane is 0.30° or less and the half width of the diffraction peak of the (114) plane is 0.50° or less, and also there is no change in specific surface area. The oxygen position parameter shows an almost constant value within the range defined in the present invention.

However, when the batteries of examples 1 to 8 and the batteries of Comparative Examples 1 and 2 are compared, the latter batteries show comparative values concerning the initial efficiency, but are not sufficient concerning the discharge capacity. The latter batteries show values lower than those of the batteries of Examples 1 to 8 for the low-temperature capacity. Therefore, in the present invention, the Li substitution content x at the transition metal site is preferably set at $0.1 \leq x \leq 0.25$.

The active materials of Examples 9 to 23 are ones in which the composition is determined so that the Na substitution content y falls within the range defined in the present invention while the value of x+y is kept constant. The results are obtained when the value x+y is set at x+y=0.2 for Examples 9 to 14, x+y=0.25 for Examples 15 to 20 and x+y=0.3 for Examples 21 to 23. On the other hand, the active materials of Comparative Examples 5 to 10 are ones in which the composition is determined so that y is a value outside the range defined in the present invention, i.e. y=0 (not substituted with Na) and 0.12 while the value of x+y is fixed at 0.2, 0.25 and 0.3. In all these Comparative examples, the oxygen position parameter is 0.264 or less, and the half width of the diffraction peak shows an almost constant value within the range defined in the present invention such that the half width of the diffraction peak of the (003) plane is 0.30° or less and the half width of the diffraction peak of the (114) plane is 0.50° or less, and also there is no change in specific surface area. The oxygen position parameter shows an almost constant value within the range defined in the present invention.

The results for the batteries of Examples 9 to 14 verses Comparative Example 5, Examples 15 to 20 verses Comparative example 7 and Examples 21 to 23 verses Comparative Example 9 show that in each case, Examples show a high initial efficiency and discharge capacity compared to Comparative Examples, and shows a high low-temperature capacity, and it is thus apparent that battery performance at a low temperature is improved by substitution with Na. Comparison of the batteries of Comparative Examples 5 and 6, Comparative examples 7 and 8 and Comparative Examples 9 and 10 shows that when substitution with Na exceeds the range defined in the present invention, the initial efficiency, the discharge capacity and the low-temperature capacity are all reduced as compared to an active material that is not substituted with Na. Therefore, in the chemical composition formula of the present invention, the Na substitution content y is required to be set at $0<y \leq 0.1$.

The active materials of Examples 24 to 31 are ones in which the composition is determined so that the Mn ratio falls within the range defined in the present invention while the Li substitution content x and the Na substitution content y at the transition metal site are kept constant. For variations in Mn ratio at this time, results of changing the ratio of Ni to determine a composition are shown in Examples 24 to 27, and results of changing the ratio of Co to determine a composition are shown in Examples 28 to 31. On the other hand, the active materials of Comparative Examples 11 to 14 are ones in which the composition is determined so that the Mn ratio is a value (c=0.35, 0.76) outside the range defined in the present invention. The active materials of all these Examples and Comparative Examples include Na, show an almost constant value within the range defined in the present invention such that the half width of the diffraction peak of the (003) plane is 0.30° or less and the half width of the diffraction peak of the (114) plane is 0.50° or less, show no change in specific surface area, and has an oxygen position parameter of 0.264 or less. The batteries of Comparative Examples 11 to 14 are poor in initial efficiency, discharge capacity and low-temperature capacity while the batteries of examples 24 to 31 show a high initial efficiency, discharge capacity and low-temperature capacity. Therefore, in the chemical composition formula of the present invention, the Mn ratio c is required to be set at $0.4 \leq c \leq 0.7$.

The active materials of Examples 32 to 34 and Comparative Example 15 are identical in chemical composition formula to the active material of Example 10, but are different in that their calcination temperatures are 1050° C., 900° C., 800° C. and 700° C., respectively. Example 32 has a calcination temperature higher than 1000° C. in Example 10, so that the half widths of diffraction peaks of the (003) plane and the (114) plane are 0.17° and 0.35°, respectively, which are smaller than 0.20° and 0.41° in Example 10. On the other hand, Examples 33 and 34 and Comparative Example 15 have a calcination temperature lower than that in Example 10, so that the half widths of diffraction peaks of the (003) plane are 0.25°, 0.30° and 0.32°, respectively, which are larger than 0.20° in Example 10, and the half widths of diffraction peaks of the (114) plane are 0.45°, 0.50° and 0.54°, respectively, which are also larger than 0.41° in Example 14, and for Comparative Example 15, the half width of the diffraction peak falls out of the range defined in the present invention. On the other hand, the oxygen position parameter is 0.264 or less in all the active materials, and shows a constant value within the range defined in the present invention.

It is apparent that the batteries of examples 32 to 34 show a high initial efficiency, discharge capacity and low-temperature capacity as in the case of Example 10, whereas the battery of Comparative Example 15 has a significantly reduced initial efficiency, discharge capacity and low-temperature capacity. Therefore, in the present invention, it is preferable that the half width of the diffraction peak of the (003) plane be 0.30° or less, and the half width of the diffraction peak of the (114) plane be 0.50° or less. For satisfying this requirement, the calcination temperature is preferably 800° C. or higher.

The active materials of Examples 35 to 38 are identical in chemical composition formula to the active material of Example 10, but are different in that the active material powder obtained after calcination is subjected to a crushing treatment by a ball mill (Pulverisette 6 manufactured by FRITSCH Inc.). As the crushing treatment time increases (5, 10, 20 and 30 minutes), the specific surface area also increases (3.9, 4.4, 5.6 and 6.1 $m^2$/g), and is larger than 2.6 $m^2$/g in Example 10.

The batteries of Examples 35 to 38 have a slight reduction in initial efficiency with the increase of the specific surface area, but shows a high initial efficiency as in the case of Example 10. Thus, the active material of the present invention does not lose its effect even though the specific surface area is increased by mechanical crushing after it is synthesized. However, excessive crushing is not preferable because battery performance may be degraded due to a reduction in crystallinity of active material particles, an increase in positive electrode field oxidization side reaction level within the battery and so on. Therefore, the specific surface area of the lithium transition metal composite oxide solid solution in the present invention is preferably 6.1 $m^2$/g or less. For satisfying this requirement, the time of crushing the active material after calcination is preferably 30 minutes or less.

The active materials of Examples 39 and 40 and Comparative Example 16 are identical in chemical composition formula to the active material of Example 10, but are different in that the speeds of dropwise addition of the raw material solution in preparation of the coprecipitation hydroxide precursor are 5 ml/min, 10 ml/min and 60 ml/min. As the dropwise addition speed increases (Examples 35 and 36), the oxygen position parameter increases (0.263 and 0.264), and is larger than 0.262 in Example 10, and in Comparative Example 16 with the dropwise addition speed of 60 ml/min, the oxygen position parameter is 0.266, and falls out of the range defined in the present invention. Also, there is a change in half widths of diffraction peaks of the (003) plane and the (114) plane, and in Examples 39 and 40, the half width of the diffraction peak falls within the range defined in the present invention such that the half widths of diffraction peaks of the (003) plane are 0.17° and 0.23°, respectively and the half widths of diffraction peaks of the (114) plane are 0.36° and 0.45°, respectively, but in Comparative Example 16, the half width of the diffraction peak falls out of the range defined in the present invention such that the half width of the diffraction peak of the (003) plane is 0.32° and the half width of the diffraction peak of the (114) plane is 0.54°.

It is apparent that the batteries of examples 39 and 40 show a high low-temperature capacity as in the case of Example 10, whereas the battery of Comparative Example 16 has a significantly reduced low-temperature capacity because the oxygen position parameter is too large, and also the half widths of diffraction peaks of the (003) plane and the (114) plane fall out of the range defined in the present invention.

When Comparative Examples 15 and 16 are compared, it can be understood that the value of the oxygen position parameter has influences on the low-temperature capacity because although the active material composition and half widths of diffraction peaks of the (003) plane and the (114) plane of both Comparative examples are the same, the low-temperature capacity of Comparative Example 16, the oxygen position parameter of which is 0.266 and falls out of the range defined in the present invention, shows a value smaller than that of Comparative Example 15, the oxygen position parameter of which is 0.262 and falls within the range defined in the present invention. Therefore, from the results of Examples 39 and 40 and Comparative Examples 15 and 16, the oxygen position parameter of the lithium transition metal composite oxide solid solution in the present invention is required to be 0.264 or less. For satisfying this requirement, the speed of dropwise addition of the raw material solution in preparation of the coprecipitation hydroxide precursor is preferably 10 ml/min or less.

The active material of Comparative example 17 is identical in chemical composition formula to the active material of Example 10, but is synthesized by the solid phase method rather than the coprecipitation method. The oxygen position parameter is 0.267 and falls significantly out of the range defined in the present invention. On the other hand, the half widths of the (003) plane and the (114) plane are 0.23° and 0.44°, respectively and fall within the range defined in the present invention.

It is apparent that the battery of Comparative Example 17 has a low-temperature capacity considerably lower than that the battery of Example 10 having the same composition. From this, it is apparent that the oxygen position parameter of the active material has a close relationship with the low-temperature characteristic of the battery.

The battery of Comparative Example 17 has a low-temperature capacity showing the lowest value among Examples and Comparative Examples of the present invention. This is considered to be because the above-described oxygen position parameter falls out of the range defined in the present invention, and also since synthesis is performed by the solid phase method, transition metals of Co, Mn and Ni are not homogeneously solid-dissolved, and elements including Li and Na may not be homogeneously distributed in one particle, and this fosters degradation of electrochemical characteristics of the active material. Therefore, selection of the coprecipitation method is preferable for synthesis of the lithium transition metal composite oxide in the present invention.

For the active material of Comparative Example 3, the half width of the diffraction peak of the (003) plane is 0.30° or less and the half width of the diffraction peak of the (114) plane is 0.50° or less, but Li is not included at the transition metal site, and the discharge capacity is not improved. Further, since the oxygen position parameter is 0.267 and falls out of the range defined in the present invention, the low-temperature capacity is low.

For the active material of Comparative Example 4, the half width of the diffraction peak of the (003) plane is 0.30° or less and the half width of the diffraction peak of the (114) plane is 0.50° or less, and the Li site is substituted with Na, but Li is not included at the transition metal site, and neither the initial efficiency nor the discharge capacity is improved. Further, since the oxygen position parameter is 0.266 and falls out of the range defined in the present invention, the low-temperature capacity is low. That is, the active material of Comparative Example 4 is such that the Li site of the active material of Comparative Example 3 is substituted with Na, but by substitution with Na, the low-temperature capacity is further reduced.

As described above, it can be said that the active material of the present invention has an increased discharge capacity and a significantly improved initial efficiency by satisfying two requirements: "the composition ratio of metal elements contained in the solid solution of the lithium transition metal composite oxide satisfies $Li_{1+x-y}Na_yCo_aNi_bMn_cO_{2+d}$ ($0<y\leq0.1$, $0.4\leq c\leq0.7$, $x+a+b+c=1$, $0.1\leq x\leq0.25$, $-0.2\leq d\leq0.2$)" and "the half width of the diffraction peak of the (003) plane is 0.30° or less and the half width of the diffraction peak of the (114) plane is 0.50° or less in the X-ray diffraction pattern". Further, it can be said that by satisfying, in addition to these two requirements, the requirement: "the oxygen position parameter determined from crystal structure analysis by the Rietveld on the basis of the X-ray diffraction pattern is 0.264 or less", the low-temperature characteristic (low-temperature capacity) is significantly improved.

INDUSTRIAL APPLICABILITY

According to the present invention, there can be provided an active material for a lithium secondary battery, which has a high discharge capacity, and particularly has a high discharge capacity at a low temperature, and the initial efficiency of which is significantly improved, and therefore the active material can be used for lithium secondary batteries of power sources for electric automobiles, power sources for electronic devices and power sources for electric power storage.

The invention claimed is:

1. An active material for a lithium secondary battery, comprising a solid solution of a sodium-containing lithium transition metal composite oxide having an α-$NaFeO_2$ crystal structure, wherein the chemical composition formula of the solid solution satisfies $Li_{1+x-y}Na_yCo_aNi_bMn_cO_{2+d}$ ($0<y\leq0.1$, $0.4\leq c\leq0.7$, $x+a+b+c=1$, $0.1\leq x\leq0.25$, $-0.2\leq d\leq0.2$), the active material has an X-ray diffraction pattern attributable to a hexagonal crystal (space group $P3_112$ or R3-m), and in the Miller index hkl, the half width of the diffraction peak of the (003) plane is 0.30° or less and the half width of the diffraction peak of the (114) plane or the (104) plane is 0.50° or less.

2. The active material for a lithium secondary battery according to claim 1, wherein the oxygen position parameter determined from crystal structure analysis by the Rietveld method on the basis of the X-ray diffraction pattern is 0.264 or less.

3. The active material for a lithium secondary battery according to claim 1, wherein the solid solution of the active material for a lithium secondary battery is produced using a coprecipitation method.

4. The active material for a lithium secondary battery according to claim 3, wherein the solid solution of the active material for a lithium secondary battery is produced by calcinating under a calcination condition of 800 to 1050° C. a mixture of a coprecipitation precursor obtained by the coprecipitation method and Li and Na salts.

5. An electrode for a lithium secondary battery, comprising the active material for a lithium secondary battery according to claim 1.

6. A lithium secondary battery comprising the electrode for a lithium secondary battery according claim 5.

* * * * *